INVENTORS
BERT KIDMAN
WILLIAM J. DAVIS

PER

ATTORNEY

INVENTORS
BERT KIDMAN
WILLIAM J. DAVIS

Patented Mar. 3, 1942

2,275,380

UNITED STATES PATENT OFFICE 2,275,380

ROTARY WEEDER FOR SINGLE ROW CULTIVATORS

Bert Kidman, Huron, S. Dak., and William J. Davis., Mandan, N. Dak., dedicated to the free use of the People of the United States of America Application August 19, 1940, Serial No. 353,234

9 Claims. (Cl. 97—179)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to use of any royalty thereon.

We hereby dedicate the invention herein described to the free use of the people of the United States of America to take effect on the granting of a patent to us.

This invention relates to a device for weeding, and is especially adaptable as an attachment to a cultivator, such as a corn cultivator, to mechanically cut out or destroy weeds growing between plants.

The device embodying this invention obviates the necessity of hand-hoeing, which is very expensive and involves a great deal of labor. Also, by attaching this device to a cultivator, the effectiveness of the cultivator is maintained while the invention is being used.

The following description, considered together with the accompanying drawings, will disclose this invention more fully, its construction, arrangement, and operation of parts, and further objects and advantages thereof will be apparent.

Figure 1:
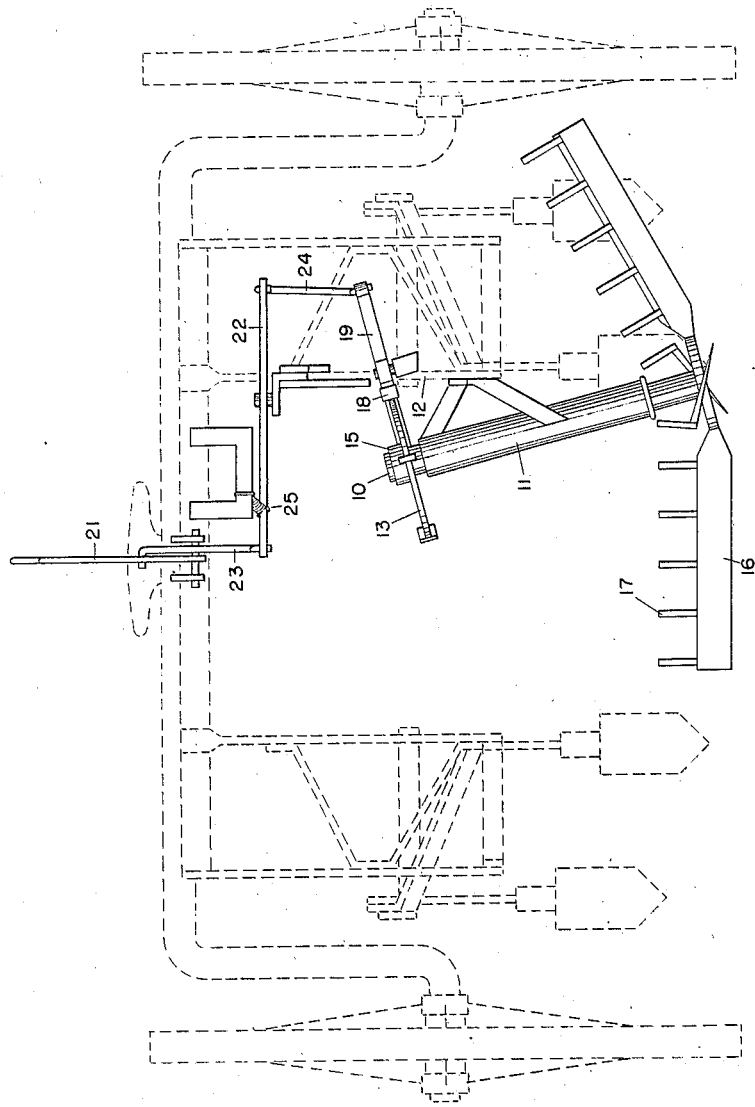
Figure 1 is a front view of a cultivator showing an embodiment of the invention attached thereto.

Referring with more particularity to the drawings in which like numerals designate like parts, a shaft 10 is rotatably mounted in a sleeve housing 11, which housing is bracketed to the frame of the cultivator 12 at an angle to the vertical, preferably 15°, in a lateral plane. The upward end of the shaft 10 extends through the housing, to which end is adjustably fixed a ratchet 13 by means of a set screw 14 mounted through a collar 15 concentrically fixed to said ratchet, or by any other suitable means. The lower end of the shaft 10 also extends through the housing 11, to which is fixed a plurality of cutting blades 16, preferably four. These blades are set at an angle to the shaft 10, so that in rotating the blades enter the soil on one side substantially parallel to the lateral axis of the machine. If the shaft 10 is set at an angle of 15°, the blades would be set at the complementary angle, or 75°, to the shaft 10. At the back of each blade 16, upright rods or pins 17 are fixed for the purpose of breaking up the soil.

The ratchet 13 is provided with the same number of notches 18 as there are blades 16. On the frame of the cultivator, a pawl or lever 19 is pivoted, one arm of which carries an abutment roller 20, or other suitable abutment means, adapted to register with the notches 18. The other arm of the lever 19 is mechanically linked to an operating handle 21 by any suitable means, such as a lever 22, pivoted to the frame of the machine, link 23 connecting one of the levers 22 to the operating handle 21, and link 24 connecting the other arm of the lever 22 to the lever 19 for the purpose of disengaging the abutment roller 20 from the ratchet. A spring 25 is provided normally urging the abutment roller 20 of the lever 19 radially against the ratchet 13. This spring may be attached between any suitable fixed point of the frame and any suitable point of the linkage system, operatively connecting the handle 21 to the lever 19, such as the point of connection of the link 23 and the lever 22, as illustrated.

Figure 2:
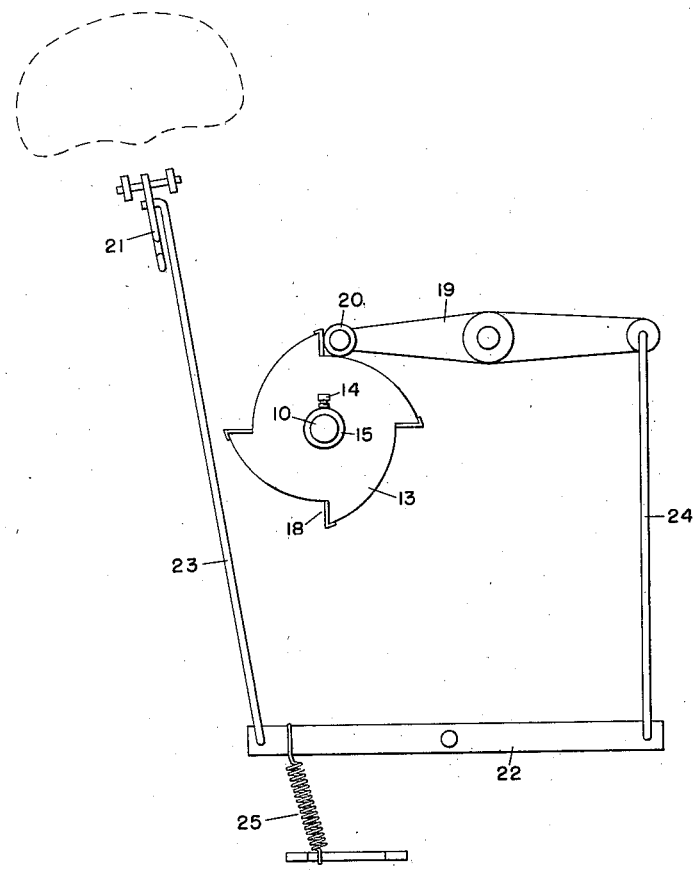
Figure 2 is a diagrammatic plan view of the tripping mechanism.

In operation, the spring 25 holds the abutment roller 20 against the ratchet 13, as described, and prevents the ratchet from rotating clockwise (as viewed in Figure 2) by engaging one of the notches 18. In this position, the relation between the blades 16 and the ratchet 13 may be adjusted by means of the set screw 14, so that one of the blades is in operating position, as shown in Figure 1. In this grounded position, the blade is held rigid when the cultivator is moved forward through the growing plants, and consequently it scrapes through the soil and cuts out or destroys the weeds between the plants in the particular row being treated. When the machine has advanced to the point where the working blade almost touches the next approaching plant, the operator actuates the handle 21 against the action of the spring 25, causing the abutment roller 20 to move out of engagement with the ratchet 13, permitting the blades to turn. The friction between the operating blade and the soil causes it to stop moving relative to the ground. Continued forward motion of the machine over the ground causes the blades to revolve, so that the oncoming plant is straddled by the last operating blade and the forward blade which comes into operating position on the other side of the plant. Just before the forward blade comes into operating position, the operator releases the handle 21 permitting the abutment roller 20 to fall in behind the next notch on the ratchet, so that the next blade will come into and be held in the proper operating position. This tripping operation is repeated for each plant.

As each blade moves through the soil cutting the weeds, the upright rods or pins 17 serve as a grating to break up the soil coming over the blade and check the growing of the weeds again.

Having thus described our invention, we claim:

1. A device of the character described in combination with a vehicle adapted to be drawn through rows of growing plants, comprising a shaft rotatably mounted on said vehicle, weeding blades radially fixed to said shaft, said shaft and blades being so disposed with respect to each other and with respect to the ground that said blades in rotating assume a horizontal position on one side of the shaft whereby said blades may be revolved by the movement of the vehicle when the horizontal blade is grounded, a ratchet adjustably fixed to said shaft, a pawl engageable with said ratchet, and means for actuating said pawl.

2. A device of the character described in combination with a vehicle adapted to be drawn through rows of growing plants, comprising a shaft rotatably mounted on said vehicle, weeding blades radially fixed to said shaft, said shaft and blades being so disposed with respect to each other and with respect to the ground that said blades in rotating assume a horizontal position on one side of the shaft whereby said blades may be revolved by the movement of the vehicle when the horizontal blade is grounded, a ratchet adjustably fixed to said shaft, a pawl engageable with said ratchet, yieldable means for normally urging said pawl to engage said ratchet, and means for disengaging said pawl from said ratchet against the action of said yieldable means.

3. A device of the character described in combination with a vehicle adapted to be drawn through rows of growing plants, comprising a shaft rotatably mounted on said vehicle, weeding blades radially fixed to said shaft, said shaft and blades being so disposed with respect to each other and with respect to the ground that said blades in rotating assume a horizontal position on one side of the shaft whereby said blades may be revolved by the movement of the vehicle when the horizontal blade is grounded, a ratchet fixed to said shaft, means for angularly adjusting said ratchet with respect to said blades, a pawl in cooperative relation with said ratchet, and and means for actuating said pawl in and out of engagement with said ratchet.

4. A device of the character described in combination with a vehicle adapted to be drawn through rows of growing plants, comprising a shaft rotatably mounted on said vehicle, weeding blades radially fixed to said shaft, said shaft and blades being so disposed with respect to each other and with respect to the ground that said blades in rotating assume a horizontal position on one side of the shaft whereby said blades may be revolved by the movement of the vehicle when the horizontal blade is grounded, a ratchet fixed to said shaft, a pawl for said ratchet, and means for actuating said pawl in and out of engagement with said ratchet.

5. A device of the character described in combination with a vehicle adapted to be drawn through rows of growing plants, comprising a shaft rotatably mounted on said vehicle, weeding blades radially fixed to said shaft, said shaft and blades being so disposed with respect to each other and with respect to the ground that said blades in rotating assume a horizontal position on one side of the shaft whereby said blades may be revolved by the movement of the vehicle when the horizontal blade is grounded, a grating secured on each blade, and means for arresting and releasing the rotation of said shaft.

6. A device of the character described in combination with a vehicle adapted to be drawn through rows of growing plants, comprising a shaft rotatably mounted on said vehicle, weeding blades radially fixed to said shaft, said shaft and blades being so disposed with respect to each other and with respect to the ground that said blades in rotating assume a horizontal position on one side of the shaft whereby said blades may be revolved by the movement of the vehicle when the horizontal blade is grounded, a plurality of upright bars secured to each blade, and means for arresting and releasing the rotation of said shaft.

7. A device of the character described in combination with a vehicle adapted to be drawn through rows of growing plants, comprising a shaft rotatably mounted on said vehicle, weeding blades radially fixed to said shaft, said shaft and blades being so disposed with respect to each other and with respect to the ground that said blades in rotating assume a horizontal position on one side of the shaft whereby said blades may be revolved by the movement of the vehicle when the horizontal blade is grounded, a grating secured on each blade, a ratchet adjustably fixed to said shaft, a pawl for said ratchet, and means for actuating said pawl in and out of engagement with said ratchet.

8. A device of the character described in combination with a vehicle adapted to be drawn through rows of growing plants, comprising a shaft rotatably mounted on said vehicle, said shaft being mounted at a vertical angle in a lateral plane, weeding blades radially fixed to said shaft, said blades being disposed at an angle to said shaft complementary to the angle which said shaft makes with the vertical, a ratchet adjustably fixed to said shaft, a pawl for said ratchet, and means for actuating said pawl in and out of engagement with said ratchet.

9. A device of the character described in combination with a vehicle adapted to be drawn through rows of growing plants, comprising a shaft rotatably mounted on said vehicle at an angle of substantially 15° with the vertical in a lateral plane, weeding blades radialy fixed to said shaft at an angle of substantially 75° to said shaft, a ratchet adjustably fixed to said shaft, said ratchet having a plurality of notches, one for each blade, a pawl for said ratchet adapted to abuttingly engage with the notches thereof, and means for actuating said pawl in and out of engagement with the notches of said ratchet.

WILLIAM J. DAVIS.
BERT KIDMAN.